United States Patent
Murayama et al.

(10) Patent No.: US 7,594,406 B2
(45) Date of Patent: Sep. 29, 2009

(54) REGENERATOR AND CRYOGENICS PUMP

(75) Inventors: Yoshinobu Murayama, Chigasaki (JP);
Shinji Furuya, Chigasaki (JP);
Hidetoshi Morimoto, Chigasaki (JP);
Junpei Yuyama, Chigasak (JP)

(73) Assignees: Ulvac Cryogenics, Inc., Kanagawa (JP);
Ulvac, Inc., Kanagawa (JP)

( * ) Notice: Subject to any disclaimer, the term of this patent is extended or adjusted under 35 U.S.C. 154(b) by 446 days.

(21) Appl. No.: 10/594,050

(22) PCT Filed: Aug. 24, 2005

(86) PCT No.: PCT/JP2005/015348
§ 371 (c)(1),
(2), (4) Date: Sep. 25, 2006

(87) PCT Pub. No.: WO2006/022297
PCT Pub. Date: Mar. 2, 2006

(65) Prior Publication Data
US 2007/0227159 A1      Oct. 4, 2007

(30) Foreign Application Priority Data
Aug. 25, 2004    (JP)    ............... 2004-245028

(51) Int. Cl.
*F25B 9/00*     (2006.01)
*F28D 17/00*    (2006.01)

(52) U.S. Cl. ............................. 62/6; 165/4

(58) Field of Classification Search ............. 62/6; 165/4
See application file for complete search history.

(56) References Cited

U.S. PATENT DOCUMENTS

| 2,044,330 | A | * | 6/1936 | Richter ........................... 62/88 |
| 2,776,562 | A | * | 1/1957 | Davie, Jr. et al. ............... 73/147 |
| 3,397,738 | A | * | 8/1968 | Daunt ........................... 165/10 |
| 4,485,631 | A | * | 12/1984 | Winkler ........................ 62/55.5 |
| 6,030,468 | A | * | 2/2000 | Yagi et al. ................... 148/301 |
| 6,363,727 | B1 |  | 4/2002 | Hashimoto et al. |

FOREIGN PATENT DOCUMENTS

| JP | 10-300251 A | 11/1998 |
| JP | 2004-143341 A | 5/2004 |
| JP | 2004-225920 A | 8/2004 |

* cited by examiner

*Primary Examiner*—William C Doerrier
(74) *Attorney, Agent, or Firm*—Carothers & Carothers

(57) ABSTRACT

The invention has an object to provide a regenerator and cryogenics pump using a regenerator material which fulfills such requirements as specific heat, thermal conductivity, manufacturing easiness, strength, hardness, chemical stabilization and low cost instead of Pb which is environmentally harmful. In a regenerator 14 which contains regenerator material 16 in an internal path for refrigerant, and in which heat is exchanged between the helium gas as refrigerant, and regenerator material, regenerator material 16 is any one of Sn, Bi—Sn alloy and Ag—Sn alloy. The regenerator material 16 is spherical. Plural spheres are packed in the internal path of the regenerator 14.

9 Claims, 3 Drawing Sheets

REGENERATOR AND CRYOGENICS PUMP

TECHNICAL FIELD

This invention relates to a regenerator which includes a regenerator material and in which heat is exchanged between the regenerator material and refrigerant gas such as helium, and a cryogenics pump provided with the regenerator.

BACKGROUND OF THE TECHNIQUE

A low temperature surface of a Cryogenics pump is placed in a vacuum chamber. Gas molecules are condensed and adsorbed on the low temperature surface and are captured by the low temperature surface, in the vacuum chamber. Thus, the cryogenics pump is a vacuum pump for evacuating the gas molecules. Generally, a small closed cycle helium refrigerator is used to obtain the low temperature surface.

It is a regenerator based refrigerator in which helium gas is used as refrigerant gas or operating gas. The compressed helium gas is transferred into the cold expansion space in the cold end and it is adiabatically expanded to obtain low temperature. The regenerator based refrigerator is characterized in that it is provided with a heat exchanger cooled as regenerator material which functions to extract heat from high temperature and pressure helium gas, flowing in one direction, to reserve heat and precool the helium gas to be transferred into the expansion space. It functions to warm the helium gas of low pressure and low temperature, flowing in the opposite directions prior to returning to the ambient temperature space.

The regenerator contains regenerator material which exchanges heat with the helium gas. Pb is used as regenerator material, which has high thermal conductivity and higher specific heat than any other metals at low temperature (under 30 k), and it is less expensive.

In some refrigerators of high capacity, magnetic material such as $Er_3Ni$, whose specific heat is higher than Pb at a very low temperature (under 15 k), is used. For example, refer to patent document 1 and patent document 2.

Patent Document 1: JP10-300251A
Patent Document 2: JP2004-143341A

DISCLOSURE OF INVENTION

[Problem to be Solved by the Invention]

Pb has a higher specific heat than the other metal at low temperature and it is inexpensive material. However, in order to improve the performance of the refrigerator, a large amount of Pb of high purity should be used. It also needs to be collected and treated properly because it is environmentally harmful if disposed of improperly. It requires special care for handling.

Magnetic material is very expensive. It has a peak specific heat of around the phase transition temperature. Accordingly, in some regenerators, several kinds of materials having peaks of specific heat at different temperatures are selected and are layer-structured in accordance with the temperature distribution in the regenerator. They are effective in contrast to the regenerator of the single layer structure. However, it is very expensive. Further, magnetic material is an intermetallic compound and it is hard, brittle and is difficult to be machined.

Accordingly, under such background, a regenerator material which fulfils such requirements as specific heat, thermal conductivity, manufacturing easiness, strength, hardness, chemical stabilization and low cost is desired, instead of Pb which is environmentally harmful. The object of the invention is to provide a regenerator and a cryogenics pump, using such regenerator material.

[Means for Solving Problem]

According to this embodiment, in a regenerator which contains regenerator material in an internal path for refrigerant and in which heat is exchanged between the refrigerant and regenerator material, the regenerator is characterized in that the regenerator material is any one of Sn, Bi—Sn alloy and Ag—Sn alloy.

In a cryogenics pump which contains regenerator material in an internal path for refrigerant and in which heat is exchanged between the refrigerant and regenerator material, the cryogenics pump is characterized in that the regenerator material is any one of Sn, Bi—Sn alloy and Ag—Sn alloy.

Regenerator material of Sn, Bi—Sn alloy and Ag—Sn alloy does not include Pb. Accordingly it has less influence on the human body and the environment. Handling is easy. It is less expensive than magnetic material. Further, it is easy to be formed into any shape. For example, it is easy to be manufactured into small spherical shapes for increasing heat exchange efficiency with refrigerant gas.

[Effect of the Invention]

According to a regenerator of this invention, any one of Sn, Bi—Sn alloy and Ag—Sn alloy is used as regenerator material for exchanging the heat with refrigerant gas. Thus, the same performance is maintained as the prior art. It is inexpensive and handling is easy.

According to a cryogenics pump of this invention, the regenerator provided with the above regenerator material is used in a refrigerator to obtain a low temperature surface. Accordingly, troublesome handling, shape or mechanical structure modification and extra expense are not necessary. This invention can provide a refrigerator and a cryogenics pump of the same performance as the prior art.

Figure 1:
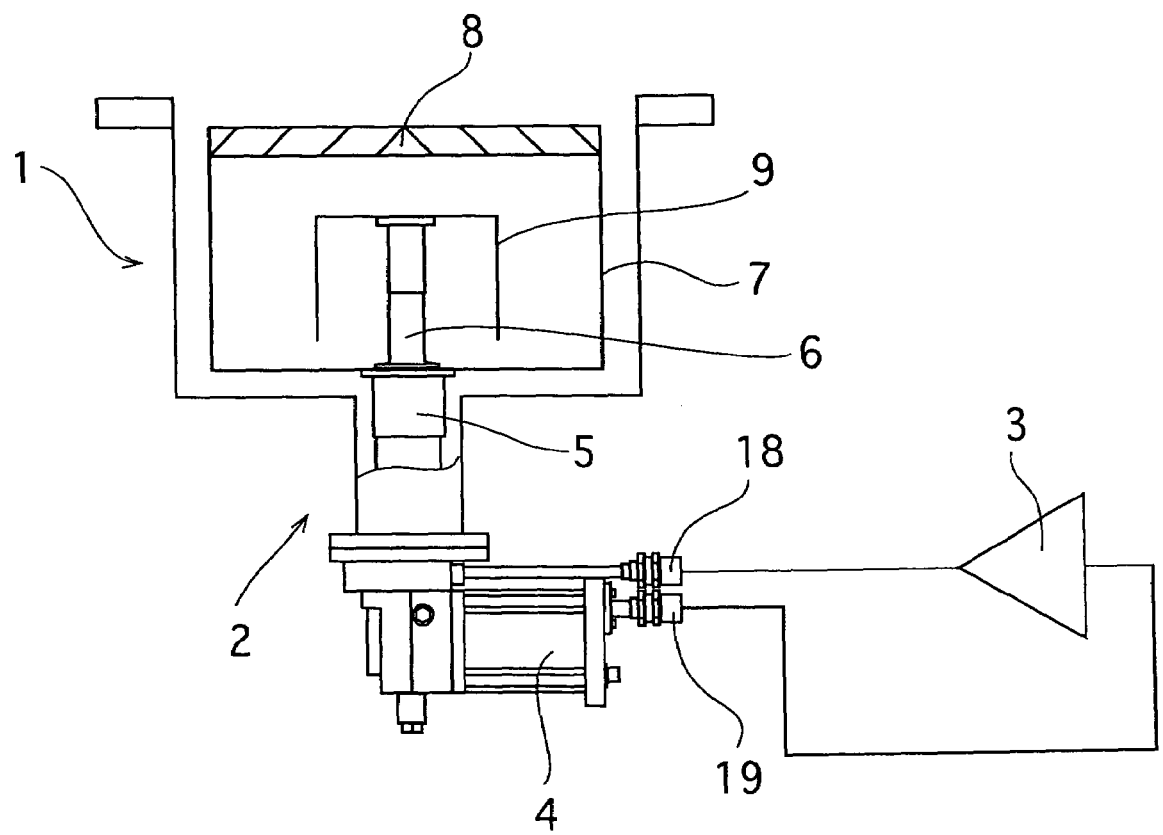
FIG. 1 is a schematic view of a cryogenics pump according to an embodiment of this invention.

EXPLANATIONS OF LETTERS OR NUMERALS 1 cryogenics pump
2 refrigerator unit
3 compressor
5 first stage cylinder
6 second stage cylinder
7 shield
8 baffle
9 cryo-panel
11 first stage displacer
12 second stage displacer
13 first stage regenerator
14 second stage regenerator
15 regenerator material
16 regenerator material
18 intake valve
19 exhaust valve
21 first stage expansion space
22 second stage expansion space 25 ambient temperature space
31 first stage heat load flange
32 second stage heat load flange

BEST EMBODIMENT OF INVENTION

Next, the embodiment of this invention will be described with reference to the drawings.

FIG. 1 is a schematic view of a cryogenics pump 1 according to one embodiment of the invention. Cryogenics pump 1 includes a refrigerator unit 2 which consists of a compressor 3, a first stage cylinder 5 and a second stage cylinder 6. Helium gas compressed by the compressor 3 is circulated through the first stage cylinder 5 and second stage cylinder 6 to cool the expansion space at an extremely low temperature. Thus, a shield 7, baffle 8 and cryo-panel 9 attached to the first stage cylinder 5 and second stage cylinder 6 are cooled at an extremely low temperature. Gaseous molecules are condensed onto them.

Figure 2:
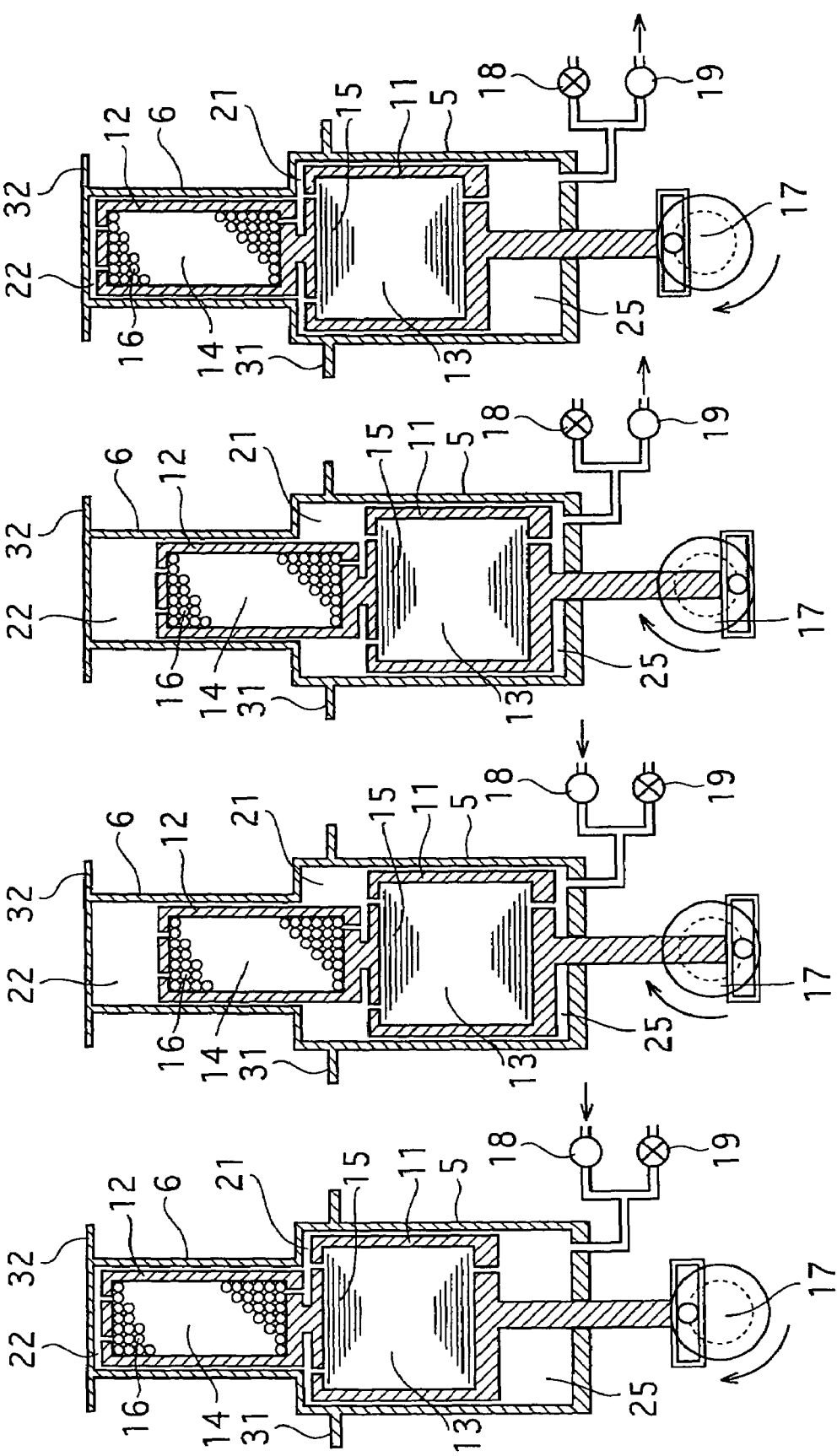
FIG. 2 is schematic views for explaining operations of refrigerator of the cryogenics pump shown in FIG. 1.

As shown in FIG. 2, a first stage displacer 11 and a second stage displacer 12 are placed in the first stage cylinder 5 and the second stage cylinder 6 respectively. The first stage displacer 11 and the second stage displacer 12 are attached to a drive shaft of a motor 4 through a cam 17. They are reciprocated up and down as one body in the first stage cylinder 5 and the second stage cylinder 6 by rotation of the motor shaft.

A first stage regenerating material 13 is contained in the first stage displacer 11, and a second stage regenerator material 14 is contained in the second stage displacer 12. Refrigerant gas, helium, passes through the first stage regenerator 13 which contains two or more copper nets as first stage regenerating material 13. Gaseous helium passes also into the second stage regenerator 14, which is filled with very small spheres, as the second stage regenerating material 16. The material of the second stage regenerating material 16 is any one of Sn, Bi—Sn alloy and Ag—Sn alloy.

First stage expansion space 21 is formed between the top wall of the first stage cylinder 5 and that of the first stage displacer 11, in the first stage cylinder 5. First stage heat load flange 31 is fixed to the outer wall of the first stage cylinder 5 corresponding to the first stage expansion space 21. As shown in FIG. 1, the shield 7 and the baffle 8 are attached to the first stage heat load flange 31, which are cooled together with the cooling of the first stage expansion space 21.

A second stage expansion space 22 is formed between the top wall of the second stage cylinder 5 and that of the second stage displacer 12, in the second stage cylinder 6. A second stage heat load flange 32 is fixed to the outer wall of the second stage cylinder 6 corresponding to the second stage expansion space 22 as shown in FIG. 1. The cryo-panel 9 is attached to the second stage heat load flange 32, which are cooled together with the cooling of the second stage expansion space 21.

Intake valve 18 and exhaust valve 19 are opened and closed by a motor 4. The intake valve 18 functions to supply gaseous helium to the first stage expansion space 21 and second stage expansion space 22 from the compressor 3, and the exhaust valve 19 functions to return the gaseous helium to the compressor 3.

When the refrigerator unit 2 is powered on, opening and closing of intake valve 18 and exhaust valve 19, and back-end-forth motion of displacers 11 and 12 are driven by the motor 4.

In FIG. 2A, exhaust valve 19 is closed and intake valve 18 is opened. High pressure gaseous helium discharged from the compressor 3 is introduced into the ambient temperature space 25 of the first stage cylinder 5.

Next, the displacers 11 and 12 are moved toward the ambient temperature space 25 with the intake valve 18 opened as shown in FIG. 2B. The helium gas passes through the regenerators 13 and 14 to the expansion spaces 21 and 22 from the ambient temperature space 25 of the first stage cylinder 5, while the helium gas is cooled with the regenerator materials 15 and 16 by heat exchange. The volume of the helium gas is reduced in the regenerators 13 and 14. Accordingly, the intake valve 18 remains opened so as to fulfill the isobaric condition.

Next, in FIG. 2C, the intake valve 18 is closed and the exhaust valve 19 is opened. High pressure helium gas in the expansion spaces 21 and 22 is discharged and therefore the pressure of the expansion spaces 21 and 22 is lowered. In that process, the helium gas is adiabatically expanded. The helium gas becomes low at temperature and pressure. The temperature of the expansion spaces 21 and 22 is lowered. The shield 7, baffle 8 and cryo-panel 19 are cooled through the heat load flanges 31 and 32.

Next, in FIG. 2D, the displacers 11 and 12 are moved towards the expansion spaces 21 and 22 while the exhaust valve 19 remains opened. The remaining helium gas in the expansion spaces 21 and 22 are moved through the regenerators 13 and 14 into the ambient temperature space 25. After the helium gas has exchanged heat with the regenerator material 15 and 16, the helium gas is exhausted from the exhaust valve 19. Thus, the cold helium gas in the expansion spaces 21 and 22 passes through the regenerating materials 15 and 16 cooling the latter which cools helium gas of the next cycle. After the helium gas temperature rises to the ambient temperature, the helium gas is exhausted and returned through the exhaust valve 19 towards the compressor 3. The exhaust valve 11 is closed and the intake valve 18 is opened. The operation of FIG. 2A starts. Thus, one cycle is ended.

Figure 3:
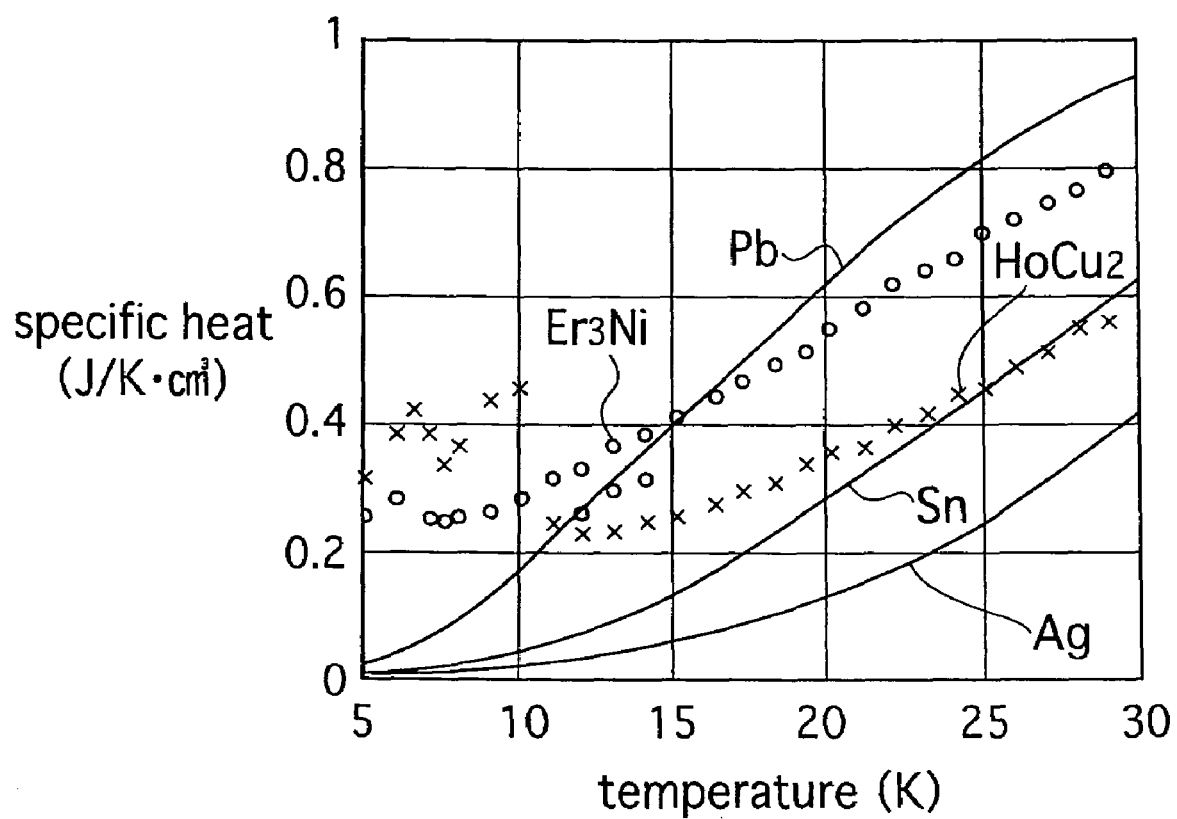
FIG. 3 is a graph of temperature-specific heat characteristics of different regenerator materials.

In this embodiment, any one of Sn, Bi—Sn alloy and Ag—Sn alloy is used as regenerator material 16 of the second stage regenerator 14 arranged in the lower temperature side, which does not include Pb. As shown in FIG. 3, the specific heat of Sn is smaller than that of Pb in the low temperature region (under 30K) obtained by the cryogenics pump. Although the specific heat is smaller, the heat capacity of regenerator material can be increased with the volume of the material. Refrigerating capacity can be substantially equal to that of the prior refrigerator using Pb. In the temperature region 25 to 30K, the specific heat of Sn is substantially equal to that of some kinds of magnetic material ($HoCu_2$). The specific heat of Bi—Sn alloy or Ag—Sn alloy is equal to that of Pb under the content percentage 50% of Bi or Ag to Sn. A regenerator of the same performance as that of single Pb can be obtained.

Sn, Bi—Sn alloy and Ag—Sn alloy can be used instead of Pb as the regenerator material with the same refrigerator capacity as the prior art. Any other construction does not need to be modified or adjusted. Simply, the regenerator material is substituted. The compatibility to the existing cryogenics pump is high. The outline and mechanical structure of the cryogenics pump are not required to be changed. The maintenance is easy.

The helium gas can smoothly flow through the regenerator material 16 consisting of plural spheres which have large surface areas and a high thermal exchange rate. Sn, Bi—Sn alloy and Ag—Sn alloy are not so hard and brittle as magnetic material. They can be easily manufactured into spheres. The diameter of the sphere is, for example, under 1 mm. In that case, a sufficient high heat exchange rate can be obtained between helium gas and the above material. However, when the diameter is as small as powder, helium gas is difficult to flow through such regenerator material. Accordingly, the range of the diameter of the sphere should be so designed that helium gas can flow smoothly therethrough.

Sn, Bi—Sn alloy and Ag—Sn alloy have less influence on the human body and the environment than Pb. Handling is easy. Further, they are less expensive than magnetic material. The cost of the former to the latter is about 1/18. Further, Sn, Bi—Sn alloy and Ag—Sn alloy fulfill such other requirements as thermal conductivity, chemical stabilization, strength and hardness.

While the preferred embodiments of the Invention have been described, without being limited to this, variations thereto will occur to those skilled in the art within the scope of the present inventive concepts that are delineated by the following claims.

The drive system for displacers 11 and 12 is not limited to the motor, but it may be of the gas pressure drive type using gas pressure difference of refrigerant such as helium gas, or the combination of the motor and the gas pressure difference type.

In the above embodiment, the refrigerator is of the Gifford McMahon type. It may be applied to the reverse stirling refrigerator, the pulse-tube type refrigerator or Solbey type refrigerators which is not limited to a cryogenics pump, but may be applied for cooling a super conductivity magnet and a low temperature sensor.

The invention claimed is:

1. In a regenerator which has an internal path where refrigerant flows and which contains regenerator material in said internal path, and in which heat is exchanged between the refrigerant and regenerator material;

the regenerator characterized in that said regenerator material is selected from the group consisting of Bi—Sn alloy and Ag—Sn alloy.

2. The regenerator according to claim 1, in which said regenerator material is comprised of plural balls which are packed in said internal path.

3. A cryogenic pump provided with a regenerator according to claim 1.

4. The regenerator accordingly to claim 1, in which said regenerator material is Bi—Sn and the content ratio of Bi to Sn in said Bi—Sn is larger than 0% and smaller than 50%.

5. The regenerator according to claim 4, in which said regenerator material is comprised of plural balls which are packed in said internal path.

6. A cryogenic pump provided with a regenerator according to claim 4.

7. The regenerator according to claim 1, in which said regenerator material is Ag—Sn and the content ratio of Ag to Sn in said Ag—Sn is larger than 0% and smaller than 50%.

8. The regenerator according to claim 7, in which said regenerator material is comprised of plural balls which are packed in said internal path.

9. A cryogenic pump provided with a regenerator according to claim 7.

* * * * *